US011131175B2

(12) United States Patent
Sahu et al.

(10) Patent No.: US 11,131,175 B2
(45) Date of Patent: Sep. 28, 2021

(54) MATRIX STIMULATION TOOL

(71) Applicant: Saudi Arabian Oil Company, Dhahran (SA)

(72) Inventors: Qasim Sahu, Dammam (SA); Fakuen Frank Chang, Dhahran (SA); Eyad Alali, Dammam (SA); Brian A. Roth, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 16/791,460

(22) Filed: Feb. 14, 2020

(65) Prior Publication Data

US 2021/0254442 A1    Aug. 19, 2021

(51) Int. Cl.
*E21B 43/26* (2006.01)
*C09K 8/72* (2006.01)
*E21B 34/14* (2006.01)

(52) U.S. Cl.
CPC ............... *E21B 43/26* (2013.01); *C09K 8/72* (2013.01)

(58) Field of Classification Search
CPC ...... E21B 43/26; E21B 2200/06; E21B 34/14; E21B 34/10; E21B 34/063; E21B 47/00; E21B 23/01; E21B 23/02; E21B 23/00; E21B 33/1243; E21B 33/1295; E21B 43/14
See application file for complete search history.

(56) References Cited

U.S. PATENT DOCUMENTS

| | | |
|---|---|---|
| 6,192,985 B1 | 2/2001 | Hinkel et al. |
| 9,243,483 B2 | 1/2016 | Keller et al. |
| 9,567,841 B2 | 2/2017 | Rothrock et al. |
| 9,915,131 B2 | 3/2018 | Ziauddin et al. |
| 2009/0107678 A1 | 4/2009 | Buckman, Sr. |
| 2014/0102801 A1 | 4/2014 | Hallundbaek et al. |
| 2014/0305649 A1 | 10/2014 | Tang et al. |
| 2014/0318786 A1 | 10/2014 | Vidma et al. |
| 2016/0153272 A1 | 6/2016 | Mace et al. |
| 2019/0016951 A1 | 1/2019 | Sherman et al. |

FOREIGN PATENT DOCUMENTS

| | | |
|---|---|---|
| CN | 105 507 855 A | 4/2016 |
| RU | 1692195 A2 * | 11/1996 |
| SU | 832 070 A1 | 5/1981 |
| WO | WO-2015/181028 A1 | 12/2015 |

OTHER PUBLICATIONS

International Search Report for PCT/IB2020/052755, 6 pages (dated Nov. 12, 2020).
Written Opinion for PCT/IB2020/052755, 8 pages (dated Nov. 12, 2020).

* cited by examiner

*Primary Examiner* — Zakiya W Bates
(74) *Attorney, Agent, or Firm* — Charles E. Lyon; Peter A. Flynn; Mehdi Hajizadegan (57) ABSTRACT

A matrix stimulation tool includes a cylindrical tube; at least one piston disposed within the cylindrical tube and longitudinally moveable within the cylindrical tube; and at least one hollow tube coupled to the piston, the hollow tube including a distal end disposed within a hole disposed within a wall of the cylindrical tube. Movement of the piston within the cylindrical tube causes movement of the distal end of the at least one hollow tube through the hole.

25 Claims, 7 Drawing Sheets

MATRIX STIMULATION TOOL

FIELD

The subject matter described herein relates to apparatuses and systems for creating tunnels in formations to stimulate hydrocarbon wells.

BACKGROUND

In matrix stimulation or matrix acidizing treatment, an acidic fluid is used to stimulate carbonate or sandstone reservoirs by pumping the fluid below the fracturing pressure. This acidic fluid reacts with the reservoir rock, thereby dissolving the rock to create a pathway for hydrocarbon production. Most reservoirs are heterogeneous in nature with respect to permeability. Acid stimulation may play a key role in enhancing and boosting the production of hydrocarbon reservoirs. Acid stimulation connects the reservoir rock to the wellbore by creating wormholes (or highly conductive channels) that bypass the formation damage. The success of the stimulation process depends on various parameters including (but not limited to): variations in reservoir permeability, reservoir thickness, reservoir lithology, perforation design, stress anisotropy, completion design, fluid selection, and many other factors that affect stimulation efficiency.

Production logging and temperature logs often show poor zonal coverage and uneven production contribution of stimulation treatments and processes. Therefore, fluid placement is a critical stage in the stimulation design to ensure that the stimulation fluids completely cover the net pay thickness. Ideally, high permeable or naturally fractured rock will receive the majority of treatment fluids, which leaves the less permeable rock unstimulated. The acid stimulation processes are more efficient when the acid reacts with rock uniformly along the well axis by creating deep wormholes and enhancing the overall permeability of the near-wellbore region. To achieve this, the reservoir zones with variable permeability need to be effectively treated.

Historically, acid placement to evenly distribute the stimulation fluids in multiple zones was achieved by diversion techniques. A diverter could be either mechanical or chemical. Mechanical diverters include packers, ball sealers, coil tubing, and particulate diverting agents such as benzoic acid flakes, rock salts, wax beads and fiber. Another form of diversion includes the use of chemical diverters as temporary fluid barriers during treatments, which are converted afterwards by chemical means to a fluid that may easily flow back. Optimum fluid placement is even more crucial, particularly when treating long horizontal open-hole wells, multiple intervals, and long perforated clusters. Currently, stimulation of long open-hole wells rely on coil tubing and jetting nozzles to place the fluid in the desired zone. However, these techniques are not sufficient, especially when used to treat three thousand (3,000) foot to ten thousand (10,000) foot wells.

SUMMARY

The present disclosed embodiments include apparatuses, systems, and methods for stimulating hydrocarbon wells using a coil-tube tunneling tool.

In one aspect, the present invention is directed to a matrix stimulation tool system including: a tube disposed within a horizontal tunnel within a formation, the horizontal tunnel fluidly connected to a borehole disposed within the formation; at least one piston disposed within the tube, the piston longitudinally moveable within the tube, the piston including a generally cylindrical shape; and at least one hollow tube coupled to the piston, the hollow tube including a distal end disposed within at least one hole disposed within a wall of the tube at an interface with the formation, where fluid pressure on an upstream side of the piston longitudinally pushes the piston, thereby causing the hollow tube to penetrate into the formation.

In some embodiments, the fluid pressure is caused by pumped acidizing solution.

In some embodiments, the hollow tube is from about five (5) to about thirty (30) feet in length, and the hollow tube includes an inner diameter from about 0.1 inch to about 0.5 inch.

In some embodiments, the system may include at least one valve disposed within the piston, the valve allowing a flow of fluid through the piston in at least one direction.

In some embodiments, the hollow tube is disposed through the hole at an angle from about fifteen (15) degrees to about seventy (70) degrees.

In some embodiments, the fluid pressure on an upstream side of the piston causes the piston to be longitudinally displaced from about one (1) foot to about thirty (30) feet.

In some embodiments, the system may include a one-way check valve disposed longitudinally upstream of the piston.

In some embodiments, the system may include a spring coupled to the piston.

In some embodiments, the system may include at least one ball valve disposed within the piston, where the ball valve opens to allow fluid to flow from an upstream side of the piston to a downstream side of the piston when the pressure on the upstream side of the piston reaches a predetermined value.

In some embodiments, the system may include at least one ball valve including at least one ball, where, in a closed position, the ball is disposed upstream of a throat area disposed in the piston, where, in an open position, the ball is disposed downstream of the throat area, and where a spring couples the ball to at least one internal wall of the piston.

In some embodiments, the predetermined pressure is from about five-thousand (5000) psi to about nine-thousand (9000) psi.

In some embodiments, the spring is disposed longitudinally upstream of the piston.

In some embodiments, the spring is disposed longitudinally downstream of the piston.

In some embodiments, the system may include at least one guide disposed downstream of the piston and adjacent to the hollow tube, guide at least partially dictating an angle at which the hollow tube penetrates the formation.

In some embodiments, the system may include a valve plenum fluidly connecting the borehole to the tube.

In some embodiments, the piston includes: a mobile piston; and a stationary piston disposed longitudinally downstream of the mobile piston, where the hollow tube is coupled to the mobile piston and disposed through the stationary piston.

In some embodiments, the system may include at least one inlet pipe fluidly connecting the valve plenum to the tube; at least one return pipe fluidly connecting the tube back to the valve plenum; at least one upstream valve disposed within the valve plenum; and at least one downstream valve disposed within the valve plenum, where the upstream valve and the downstream valve are selectively adjusted to open and closed positions corresponding to forward flow and reverse flow operations of the matrix stimulation tool.

In some embodiments, the system may include a top notch disposed within the tube; and a bottom notch disposed within the tube, where the top notch and the bottom notch are disposed between the mobile piston and the stationary piston.

In some embodiments, the system may include a top notch disposed within the tube; and a bottom notch disposed within the tube, where the top notch and the bottom notch are disposed longitudinally upstream of both the mobile piston and the stationary piston.

In another aspect, the present invention is directed to a matrix stimulation tool including: a cylindrical tube; at least one piston disposed within the cylindrical tube, the piston longitudinally moveable within the cylindrical tube; and at least one hollow tube coupled to the piston, the hollow tube including a distal end disposed within a hole disposed within a wall of the cylindrical tube, where movement of the piston within the cylindrical tube causes movement of the distal end of the hollow tube through the hole.

In another aspect, the present invention is directed to a method of stimulating a formation including; disposing a stimulation tool within a horizontal tunnel disposed in the formation, the horizontal tunnel fluidly connected to a borehole disposed within the formation, the stimulation tool including: a cylindrical tube; at least one piston disposed within the cylindrical tube; and at least one hollow tube coupled to a downstream side of the piston; providing pressurized fluid to an upstream side of the piston via the borehole such that the pressurized fluid pushes the piston longitudinally downstream thereby causing the hollow tube to penetrate the formation; and actively or passively opening a valve coupled to the matrix stimulation tool such that the pressure differential between the upstream and downstream sides of the piston is reduced.

In some embodiments, the method may include disposing the stimulation tool at a second depth within the horizontal tunnel; and re-pressurizing the upstream side of the piston.

In some embodiments, the pressurized fluid comprises an acidizing solution including at least one of hydrochloric acid (HCl), hydrofluoric acid (HF), $CaMg(CO_3)_2$, $CaCO_3$, FeS, formic acid, and acetic acid at concentrations by weight from about one (1) percent to about forty (40) percent.

In some embodiments, the acidizing solution includes hydrofluoric acid (HF) and/or acetic acid.

In some embodiments, the acidizing solution includes $CaMg(CO_3)_2$, $CaCO_3$, FeS, and/or formic acid.

Throughout the description, where an apparatus, systems or embodiments are described as having, including, or comprising specific components, or where methods are described as having, including, or comprising specific steps, it is contemplated that, additionally, there are systems, apparatuses or embodiments of the present invention that consist essentially of, or consist of, the recited components, and that there are methods according to the present invention that consist essentially of, or consist of, the recited processing steps.

It should be understood that the order of steps or order for performing certain action is immaterial as long as the invention remains operable. Moreover, two or more steps or actions may be conducted simultaneously.

The following description is for illustration and exemplification of the disclosure only, and is not intended to limit the invention to the specific embodiments described.

The mention herein of any publication, for example, in the Background section, is not an admission that the publication serves as prior art with respect to any of the present claims. The Background section is presented for purposes of clarity and is not meant as a description of prior art with respect to any claim.

BRIEF DESCRIPTION OF THE DRAWINGS

A full and enabling disclosure of the present disclosed embodiments, including the best mode thereof, directed to one of ordinary skill in the art, is set forth in the specification, which makes reference to the appended figures, in which.

DESCRIPTION OF CERTAIN EMBODIMENTS OF THE INVENTION

Reference will now be made in detail to the present disclosed embodiments, one or more examples of which are illustrated in the accompanying drawings. The detailed description uses numerical and/or letter designations to refer to features in the drawings. Like or similar designations in the drawings and description have been used to refer to like or similar parts of the present embodiments.

The present embodiments are directed to improved systems and methods for acid placement in acid stimulation treatments in extended-reach, open-hole wells, by using a coil-tube tunneling tool. The coil-tube tunneling tool includes enhancements for creating tunnels in stimulation treatments for both carbonate and sandstone reservoirs in open-hole horizontal wells. The tool uses a stimulation tunneling tool that is deployed with Coil-Tubing (CT) to create multiple tunnels in open-hole horizontal completions.

The tool consists of a spring, piston, tilted holes, and small hollow tubes equipped with a nozzle at the end of the tube that are extended from the inside of the coil tubing into the formation while jetting the stimulation fluids, in order to create or extend passageways inside the reservoir. The present disclosed embodiments may include a single small hollow tube, but other embodiments may include multiple hollow tubes. Using the present embodiments, tunneling may be achieved by both the jetting action and reaction of fluids with the formation.

Figure 1:
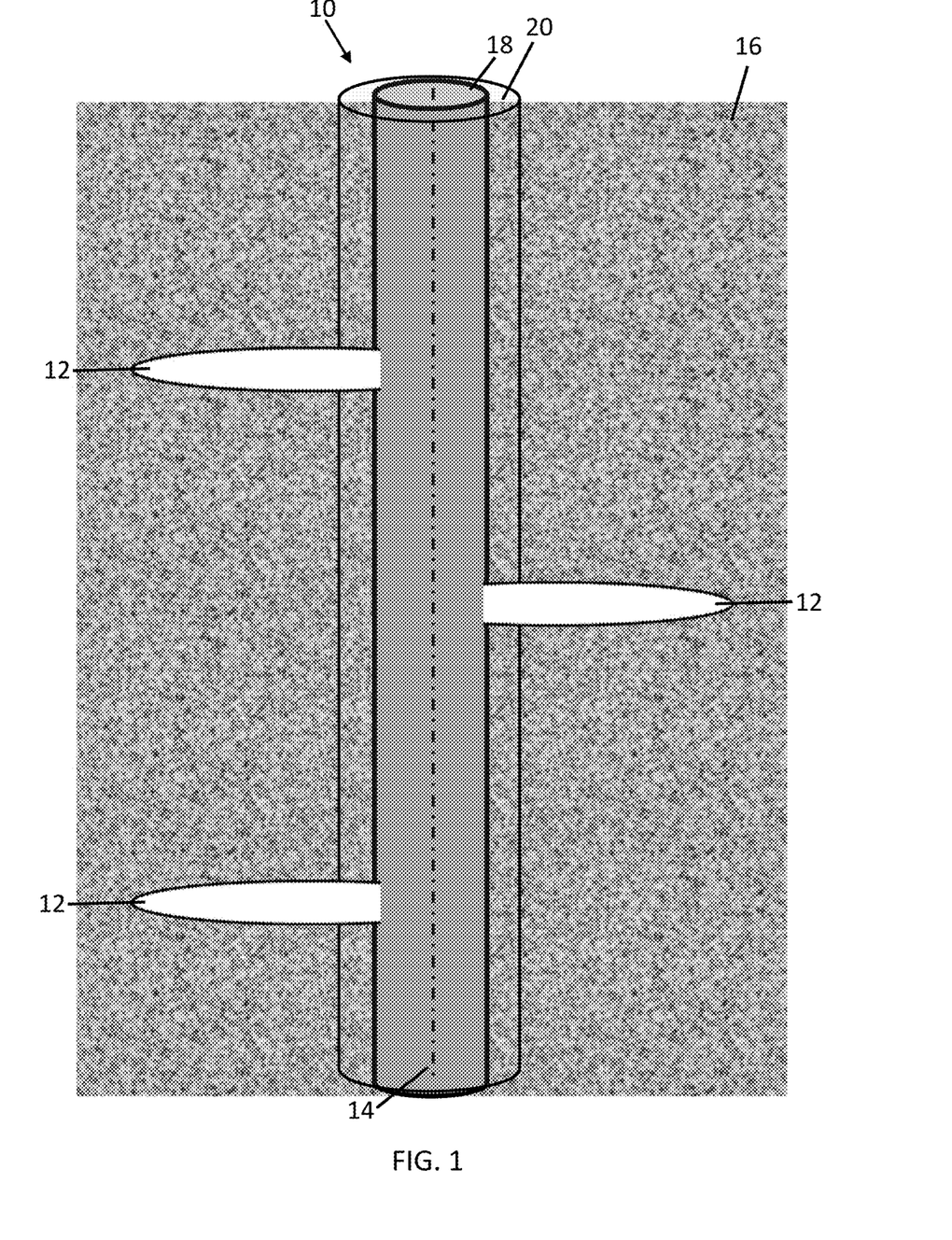
FIG. 1 illustrates a side view of an exemplary wellbore with stimulation tunnels.

FIG. 1 illustrates a borehole 10 formed in a formation 16. The borehole 10 may be generally cylindrically-shaped and may be concentric about a centerline 14. A casing 18 may be disposed within the borehole 10. The casing 18 may also be disposed concentrically about the centerline 14. An annulus 20 disposed both within the borehole 10 and radially outward of the casing 18 may be filled with concrete to help hold the casing 18 in place. One or more tunnels 12 may extend horizontally into the formation 16 from the center of the casing 18 such that holes are disposed through both the casing 18 and the concrete-filled annulus 20 to fluidly connect the center of the casing 20 to each tunnel 12. The one or more tunnels 12 may be used to enhance the extraction of hydrocarbons out of the formation 16 by fluidly connecting a larger volume of the formation 16 to the borehole 10.

Figure 2:
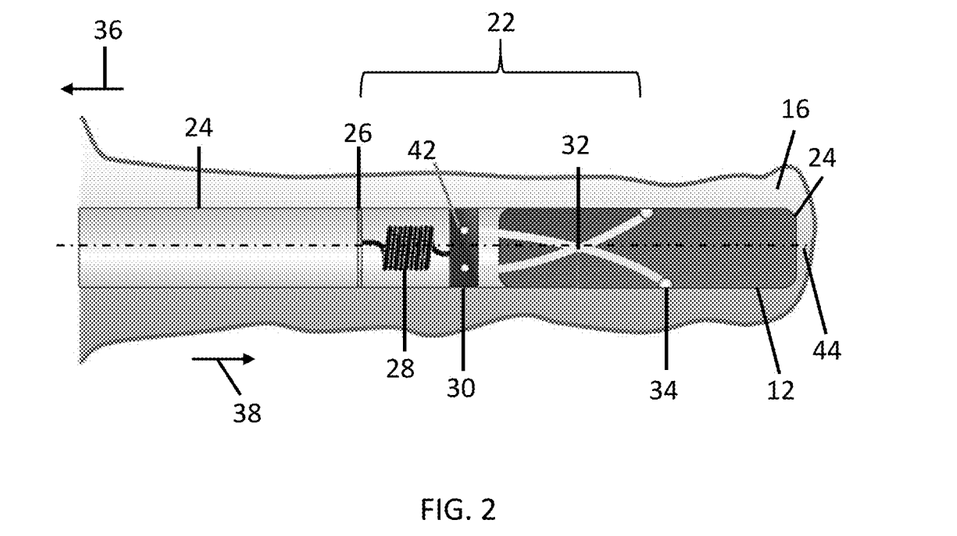
FIG. 2 illustrates a side view of a coil-tube tunneling tool, according to aspects of the present embodiments.

FIG. 2 illustrates a side view of a coil-tube tunneling tool (CTT) 22 (or matrix stimulation tool 22), according to aspects of the present embodiments. The CTT 22 may be disposed within a tube 24 disposed horizontally within the horizontal tunnel 12. The CTT 22 may include a one-way check valve 26 mechanically coupled to one or more springs 28. The one-way check valve 26 may allow fluid to pass through in a tunnel longitudinal direction 38, but not in a negative tunnel longitudinal direction 36. Both the tunnel longitudinal direction and the negative tunnel longitudinal direction 36, 38 are established with reference to the tunnel 12, which may be substantially cylindrical and may also be substantially perpendicular to (for example, within about five (5) degrees, about ten (10) degrees, or about fifteen (15) degrees of) the borehole centerline 14 (shown in FIG. 1). A piston 30 may be mechanically coupled to an opposite end of the one or more springs 28 (that is, the end of the spring 28 not coupled to the one-way check valve). One or more ball valves 42 (or pressure relief valves) may be disposed within the piston 30. A hollow tube 32 may be coupled to each ball valve 42 such that when each ball valve 42 is opened, each hollow tube 32 is fluidly coupled to an upstream side (that is, the left side in the illustration of FIG. 2) of the piston 30. When the each ball valve 42 is in a closed position, each hollow tube 32 is not fluidly connected to the upstream side (that is, the left side) of the piston 30. Each of the hollow tubes 32 may extend longitudinally into the tunnel 12 past the end of the tube 24. In addition, each of the hollow tubes 32 may be curved or contoured such that a portion of the orientation of each tube 32 extends radially inward or radially outward from a tube centerline 44.

Figure 3:
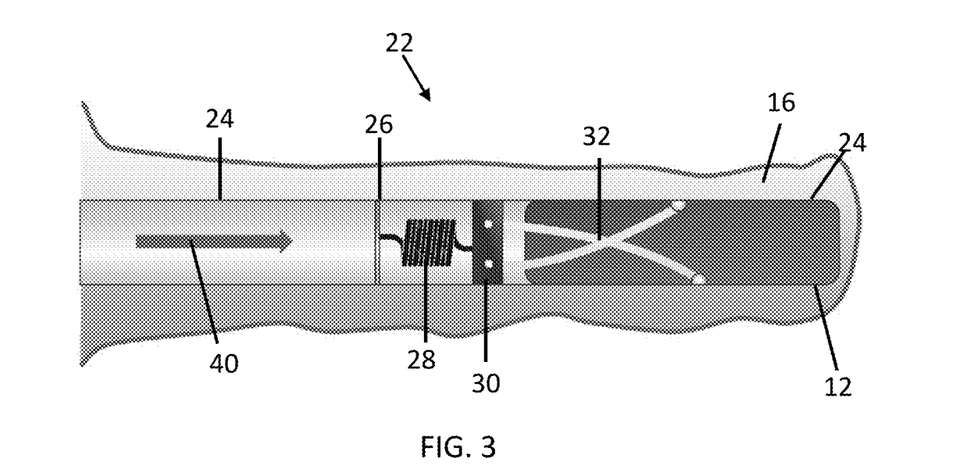
FIG. 3 illustrates a side view of a coil-tube tunneling tool, according to aspects of the present embodiments.

FIGS. 3-6 illustrate a side view of a coil-tube tunneling tool (CTT) or matrix stimulation tool 22, according to aspects of the present embodiments, including the horizontal tube 24 disposed within the tunnel 12, the one-way check valve 26, the spring 28, the piston 30, and the hollow tubes 32, all disposed within the formation 16. In the embodiment of FIG. 3, a fluid flow 40 enters the tube 24 from the borehole 10 (shown in FIG. 1).

Figure 4:
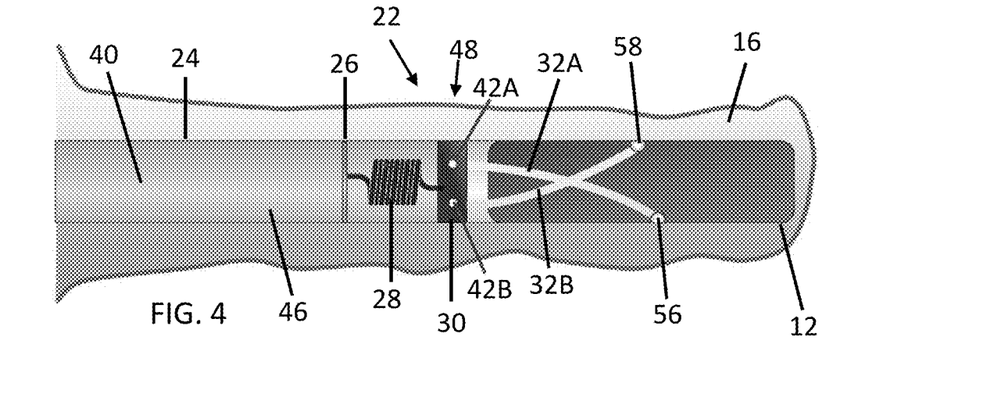
FIG. 4 illustrates a side view of a coil-tube tunneling tool, according to aspects of the present embodiments.

In the embodiment of FIG. 4, fluid 40 fills an upstream volume 46 (that is, the volume within the tube 24 upstream of the piston 30, on both sides of the one-way check valve 26). The piston 30 remains in an initial position 48. The hollow tubes 32 may include a first hollow tube 32A disposed at a top portion of the piston 30 and coupled to a top ball valve 42A, as well as a second hollow tube 32B disposed at a bottom portion of the piston 30 and coupled to a bottom valve 42B. Each of the CTT 22 embodiments of FIGS. 2-6 may include anywhere from a single hollow tube 32 to eight (8) or about ten (10) or more hollow tubes. For example, the CTT 22 may include from about two (2) to about six (6) hollow tubes 32 (coupled thereto), or from about three (3) to about four (4) hollow tubes 32 (coupled thereto). Each of the hollow tubes 32 may be approximately evenly spaced around the piston 30. For example, in embodiments that include three (3) hollow tubes 32, each 32 tube is spaced about one-hundred and twenty (120) degrees apart; in embodiments that include four (4) hollow tubes 32, each tube 32 is spaced about ninety (90) degrees apart; and in embodiments that include six (6) hollow tubes 32, each tube 32 is spaced about sixty (60) degrees apart. The first hollow tube 32A may contact a tunnel wall at a first hole 56 disposed at the bottom of the tunnel 12 while the second hollow tube 32B may contact the tunnel wall at a second hole 58 disposed at the top of the tunnel 12. As such, the first hollow tube 32A may extend from the top portion of the piston 30 to the bottom of the tunnel 12, while the second hollow tube 32B may extend from the bottom portion of the piston 30 to the top of the tunnel 12, thereby enabling each of the first and second hollow tubes 32A, 32B to bend through an increased or maximum radius of curvature, (which may result in a reduction in sheer or bending stresses on the hollow tubes 32).

Figure 5:
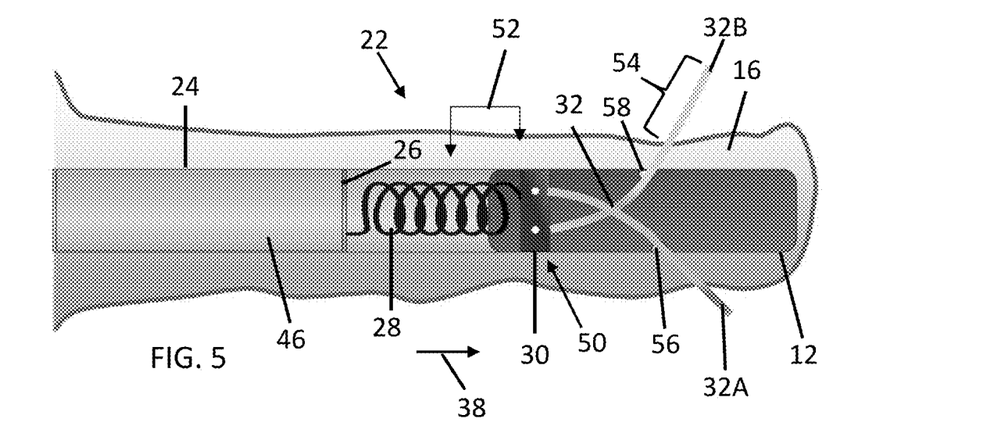
FIG. 5 illustrates a side view of a coil-tube tunneling tool, according to aspects of the present embodiments.

In the embodiment of FIG. 5, the one or more ball valves 42A, 42B (or pressure relief valves) are initially closed and the pressure has built up in the upstream volume to the point where the force on the upstream side of the piston 30 is equal to or greater than the tension from the spring 28 holding the piston 30 to the one-way check valve 26. As a result, the piston 30 translates longitudinally 38 (that is, to the right in the illustration of FIG. 5) within the tube 24 and tunnel 12. As the piston 30 moves longitudinally, the first and second hollow tubes 32A, 32B are pushed by the piston 30 through the first and second holes 56, 58 thereby extending a distance 54 onto the formation 16. As the first and second hollow tubes 32A, 32B are pushed into the formation 16, they create passageways that extend upwardly or downwardly, or both upwardly and downwardly (or sideways) from the tunnel 12, thereby serving to stimulate the tunnel and wellhole. The piston 30 may extend longitudinally 38 to a second position 50 which is longitudinally disposed a displacement distance 52 from the original piston position 48 (shown in FIG. 4). The displacement distance may be from about one (1) foot to about thirty (30) feet, or from about three (3) feet to about twenty (20) feet, or from about seven (7) feet to about fifteen (15) feet.

Figure 6:
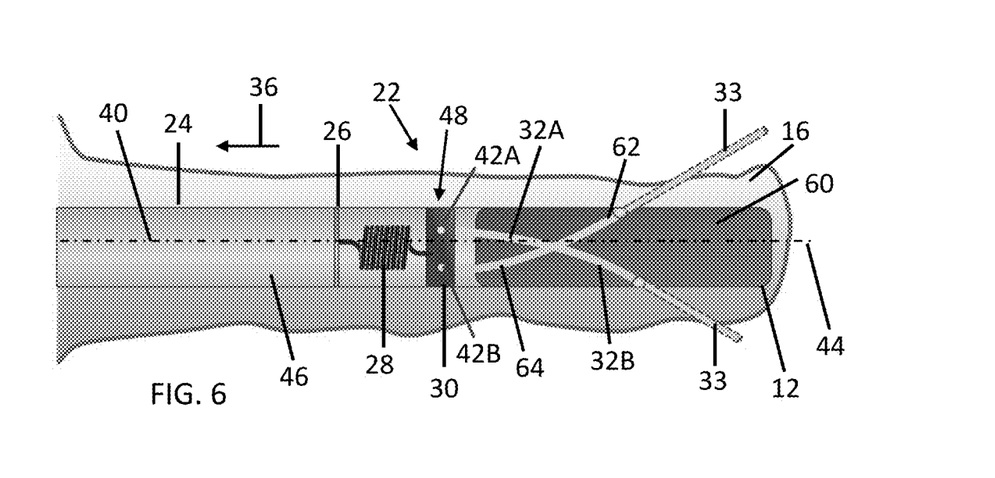
FIG. 6 illustrates a side view of a coil-tube tunneling tool, according to aspects of the present embodiments.

In the embodiment of FIG. 6, the one or more ball valves 42A, 42B (or pressure relief valves) open, thereby allowing fluid 40 to flow into the formation and a downstream volume 60 (that is, downstream of the piston 30) of the tunnel 12. As each of the ball valves 42A, 42B opens, fluid 40 flows through the first and second hollow tubes 32A, 32B to the downstream volume 60, thereby equalizing the pressure upstream and downstream of the piston 30 (or at least reducing the pressure differential between the upstream and downstream volumes 46, 60). As a result, the piston 30 begins to retract (that is, in a negative longitudinal direction 36) back toward the one-way check valve 26, as a result of the tension in the spring 28. Pressure in the downstream volume 60 forces fluid 40 into each of the newly formed passageways 33 (that is, passageways 33 that were formed as a result of the first and second hollow tubes 32A, 32B being forced into the formation 16).

Referring still to FIGS. 2-6, the fluid may include an acidizing solution to further enhance the stimulation of the tunnel 12 and formation 16 (that is, via chemical means, in addition to the mechanical means resulting from the spring 28, piston 30, and hollow tubes 32, for example). The acidizing solution 40 may include hydrochloric acid (HCl), hydrofluoric acid (HF), $CaMg(CO_3)_2$, $CaCO_3$, FeS, formic acid, or acetic acid at concentrations by weight from about one (1) percent to about forty (40) percent, or from about two (2) percent to about thirty (30) percent, or from about three (3) percent to about twenty-five (25) percent, or from about four (4) percent to about twenty (20) percent, or from about five (5) percent to about fifteen (15) percent, or from about seven (7) percent to about thirteen (13) percent, or from about eight (8) percent to about eleven (11) percent, as well as other sub-ranges therebetween. The acidizing solution reacts with the sandstone or carbonate, dissolving or partially dissolving it, thereby helping to increase the porosity of the formation. In one embodiment, the acidizing solution may include hydrochloric acid (HCl) at a concentration (that is, weight percent) from about five (5) percent to about thirty-two (32) percent. In another embodiment, the acidizing solution may include a gelled hydrochloric acid (HCl) at a concentration (that is, weight percent) from about five (5) percent to about thirty-two (32) percent. In other embodiments, the acidizing solution may include KCl, $NH_4Cl$ brine, drilling mud, gelled water, fresh water, brine, as well as acidizing solutions containing a friction-reducing polymer. In other embodiments, the injected fluid or acidizing solution may contain abrasive solids such as sand or metal particles in spherical or platelet shapes. The particle size may range from about 0.01 mm to about 0.5 mm average diameter or from about 0.05 mm to about 0.2 mm average diameter. In one or more embodiments, the concentration of the solid particles may range from about 0.05% to about 10% by volume or from about 0.1% to about 5% by volume.

Still referring to FIGS. 2-6, in one embodiment, the tube 24 may have an inner diameter from about one (1) inch to about six (6) inches, or from about two (2) inches to about four (4) inches, or about two and seven eights $$\left(2\frac{7}{8}\right)$$

inches. Each of the hollow tubes 32 may have an inner diameter from about 0.1 inch to about 0.5 inch, or from about 0.2 inch to about 0.4 inch, or from about four (4) millimeters to about ten (10) millimeters, or from about five (5) millimeters to about nine (9) millimeters. The hollow tubes 32 may be from about five (5) to about thirty (30) feet in length, or from about ten (10) to about twenty-five (25) feet in length, or from about fifteen (15) to about twenty (20) feet in length. Each of the first and second holes 56, 58 may be oriented at an angle from about ten (10) degrees to about sixty (60) degrees, or from about fifteen (15) degrees to about seventy (70) degrees, or from about fifteen (15) degrees to about fifty (50) degrees, or from about twenty (20) degrees to about forty (40) degrees relative to the tube centerline 44. The orientations of each of the first and second holes 56, 58 (as well as other holes) may dictate the angle at which the hollow tubes penetrate the formation 16. Factors such as the grain structure of the formation 16, the weak point, the preferential dissolution channel within a formation, as well as the orientation of the tunnel 12 itself may all impact the angle of each of the first and second holes 56, 58, as well as the resulting angle at which each of the hollow tubes 32 penetrates the formation 16. Each of the first and second holes 56, 58 (as well as other holes) may have a diameter from about 0.3 inches to about 0.7 inches, or from about 0.4 inches to about 0.6 inches, or from about 0.45 inches to about 0.55 inches, or from about ten (10) millimeters to about fifteen (15) millimeters.

Referring still to FIGS. 2-6, in operation the CTT 22 mechanism extends the hollow tubes 32 into the formation 16 using the piston and the spring, which create a pressure chamber downhole. Upon injecting stimulation fluids 40 into the borehole, pressure builds up inside the chamber (that is, in the upstream volume 46) and pushes the piston 30 forward, the piston 30 being connected to the hollow tubes 32. The hollow tubes 32 are mounted to the respective first and second holes 56, 58. The piston 30 may be connected to the spring 28 via a weld, braze, compression fit, adhesion, glue, epoxy, latch, or other suitable mechanisms. Once the hollow tubes 32 are extended and penetrate the formation 16, a resettable relief valve (that is, the one or more ball valves 42) in the piston 30 will activate at a pre-determined pressure (for example, from about 5,000 psi to about 9,000 psi, in one embodiment) to release the pressure from the downstream volume 60 to the upstream volume 46. The spring 28 may then retract, pulling the hollow tubes 32 out of the reservoir 16 (or formation). The maximum length of each of the passageways formed by the hollow tubes 32 penetrating the formation 16 is approximately equal to the linear extension of the spring 28 within the tube 24, or the tunnel 12, or within both the tube 24 and the tunnel 12. This process may be repeated as needed in the open downstream volume 60 to create the required or desired number of passageways. Stated otherwise, the tube 24 may be pushed into (and pulled out of) the tunnel 12 to various penetration depths within the tunnel to create passageways therewithin, thereby serving to stimulate the formation 16.

Still referring to FIGS. 2-6, each of the hollow tubes 32 may include one or more nozzles at the distal end 62 (or tip of each hollow tube 32). The nozzle may include one or more orifices or jetting features to help accelerate the flow of acidizing solution therethrough, thereby creating a jetting action and allowing acidizing solution to flow a greater distance into the formation 16. The hollow tubes 32 may include a wall thickness form about one sixteenth (1/16) of an inch to about one quarter (1/4) of an inch, or from about one eighth (1/8) of an inch to about three sixteenths (3/16) of an inch. Each of the hollow tubes 32 may be coupled to the piston 30 via a weld joint, braze joint, epoxy, glue, compression fit, fusion, or threaded joint (that is, each hollow tube 32 may include external threading that engages with threading internal to the piston 30). The CTT 22 may be assembled prior to deployment in the borehole 10, with each of the hollow tubes 32 remaining coupled to the piston 30 at a proximal end and disposed through the respective hole 56, 58 at a distal end 62. Each hollow tube 32 must be rigid and unreactive with the acidizing solution such that each hollow tube 32 may withstand the forces exerted thereupon by the rapid movement of the piston 30, as well as by the formation 16, as each tube 32 penetrates the reservoir. By sliding the coil-tube tunneling tube (CTT) 22 to various depths within the tunnel 12, each of the hollow tubes 32 may penetrate different locations within the formation 16, while remaining disposed through each respective hole 56, 58 (that is, the hollow tubes 32 remain disposed through the holes 56, 58 in the tube 24 both in an extended position (similar to FIG. 5) as well as in a retracted position (similar to FIGS. 4 and 6)).

Referring still to FIGS. 2-6, as the hollow tubes 32 are forced into the formation 16, debris or other rock material from the formation may fill the hollow tubes 32. However, due to the continual flushing of the hollow tubes 32 with acidizing solution, any debris or material that enters the hollow tube 32 will be purged therefrom, or alternatively will dissolve upon reaction with the acidizing solution. Fluids and debris may exit the tunnel 12 via an annulus defined by the space between the outer surface of the tube 24, and the walls of the tunnel 12. Fluids and debris may also exit the tunnel 12 via wormholes in the formation that eventually fluidly connect with the annulus of the borehole 10. Alternatively, in some embodiments, a release mechanism (not shown) disposed within the one-way valve 26 may be released, thereby permitting two-way flow through at least a portion of the one-way valve 26, at least temporarily, in order to allow for the draining of debris and materials from the tunnel 12.

Figure 7:
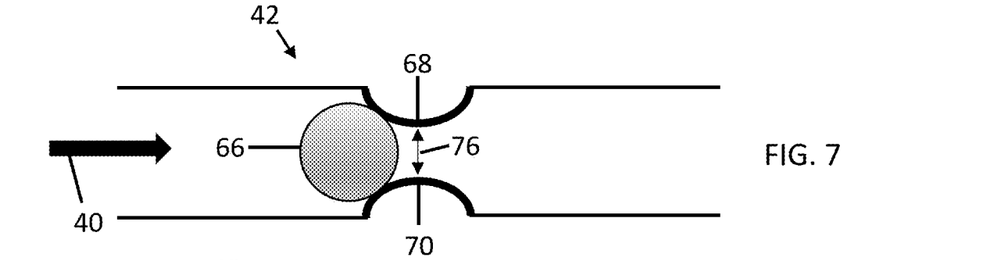
FIG. 7 illustrates a side view schematic of a ball-valve, according to aspects of the present embodiments.

FIGS. 7-10 illustrate an enlarged side view of the ball valve assembly 42 illustrated in FIGS. 2-6. In the embodiment of FIG. 7, the ball valve assembly 42 may be disposed within the piston 30 and may include a spherical ball 66 disposed upstream of an upper flexible strip 68 and a lower flexible strip 70. The upper and lower flexible strips 68, 70 prevent the spherical ball 66 from passing downstream due to the diameter of the spherical ball 66 being greater than a throat height 76 (or alternatively, due to a cross-sectional area of the spherical ball 66 being greater than a throat area 76). The throat height 76 may be defined as the distance between the upper and lower flexible strips 68, 70. The fluid flow 40 pushes the spherical ball 66 adjacent to the orifice (or throat) defined by the upper and lower flexible strips 68, 70, which prevent both the spherical ball 66 and the fluid flow 40 from passing.

Figure 8:
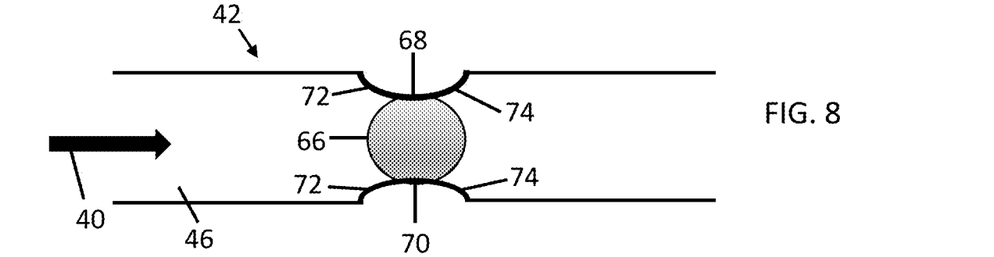
FIG. 8 illustrates a side view schematic of a ball-valve, according to aspects of the present embodiments.

In the embodiment of FIG. 8, fluid continues to flow into the upstream volume 46, thereby increasing the pressure in the upstream volume 46 and forcing the spherical ball 66 between the upper and lower flexible strips 68, 70. As the fluid flow 40 forces the spherical ball 66 into the throat (or orifice), the spherical ball 66, as well as each of the upper and lower flexible strips 68, 70 may deform such that spherical ball 66 may be squeezed between the upper and lower flexible strips 68, 70. Each of the upper and lower flexible strips 68, 70 may include both an upstream edge 72 as well as a downstream edge 74. In some embodiments, the modulus of elasticity (that is, the Young's modulus) may be higher in the upstream edge 72 than in the downstream edge 74, thereby making it harder for the spherical ball 66 to pass through the throat (or orifice) when traveling in a downstream direction than when traveling in an upstream direction. Stated otherwise, because the downstream edge 74 may be more flexible than the upstream edge 72, the spherical ball 66 may more easily pass through the orifice (or throat) when travelling upstream than when travelling downstream. In one embodiment, the upstream edge 72 includes a modulus of elasticity that is about ten (10) percent higher than that of the downstream edge 74. In another embodiment, the upstream edge 72 may include a modulus of elasticity that is about twenty (20) percent higher than that of the downstream edge 74. In another embodiment, the upstream edge 72 may include a modulus of elasticity that is about fifty (50) percent higher than that of the downstream edge 74. In another embodiment, the upstream edge 72 may include a modulus of elasticity that is about one hundred (100) percent higher than that of the downstream edge 74. In another embodiment, the upstream edge 72 may include a modulus of elasticity that is more than (100) percent higher than that of the downstream edge 74. In another embodiment, the upstream edge 72 may include a modulus of elasticity that is from about twenty (20) percent to about ninety (90) percent higher than that of the downstream edge 74.

Figure 9:
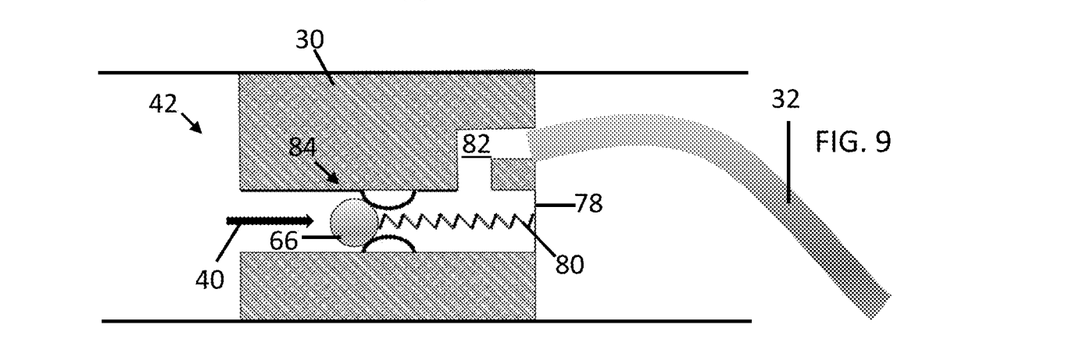
FIG. 9 illustrates a side view schematic of a ball-valve, according to aspects of the present embodiments.

FIG. 9 illustrates an enlarged side view of the ball valve assembly 42, disposed within the piston 30. In the embodiment of FIG. 9, the spherical ball 66 is mechanically coupled to a piston back wall 78 via one or more springs 80. In the embodiment of FIG. 9, the one or more springs 80 may be in a resting state (that is neither compressed nor in tension) when the spherical ball 66 is just upstream of (for example adjacent to, on an upstream side of) the orifice or throat 84. In the embodiment of FIG. 9, the spherical ball 66 prevents a fluid flow 40 (for example, a flow of acidizing solution) from reaching a downstream flow passage 82 fluidly connected to the one or more hollow tubes 32.

Figure 10:
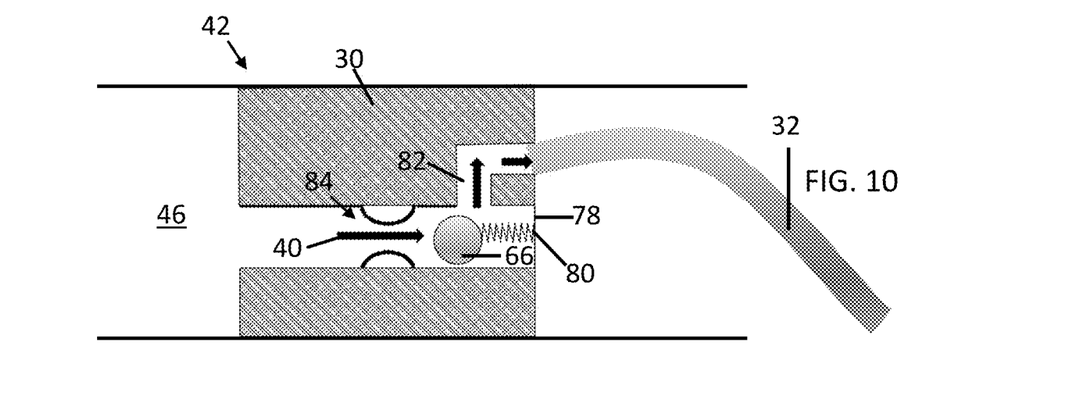
FIG. 10 illustrates a side view schematic of a ball-valve, according to aspects of the present embodiments.

FIG. 10 illustrates an enlarged side view of the ball valve assembly 42, disposed within the piston 30. In the embodiment of FIG. 10, the fluid flow 40 and the pressure in the upstream volume 46 have increased to the point where the force on the spherical ball 66 is enough to force the spherical ball 66 through the orifice (or throat) 84. As a result, the fluid flow 40 passes through the orifice 84 and flows into the downstream passage 82, and eventually into the hollow tube 32 fluidly coupled thereto. The fluid flow 40 pushes downstream against the spherical ball 66, thereby compressing the spring 80. As the fluid flow 40 and/or the pressure in the upstream volume 46 decrease, the spring 80 (which is anchored to the back wall 78) decompresses and expands, thereby pushing the spherical ball 66 back through the throat 84 (or orifice).

Referring still to FIGS. 7-10, the present disclosed embodiments may include other valve arrangements. For example, in one embodiment, one or more spring-loaded regulator valves may be disposed within the piston 30. The spring may naturally expanded to extend a stem to close the fluid pathway. When fluid pressure increases such that the upstream force on the valve is greater than the spring extension force, the spring is compressed and the stem-sealed orifice opens. In another embodiment, the piston 30 may include a spring-loaded valve including a plunger at one end of the spring. The plunger may be coupled to the valve assembly or piston such that it acts to seal the orifice or throat 84. The fluid flow through the throat area is blocked by the plunger. When the fluid pressure force exerting on the plunger is greater than the spring force, the spring extends, allowing fluid to pass through the orifice or throat 84, which is no longer sealed by the plunger.

Figures 11, 12:
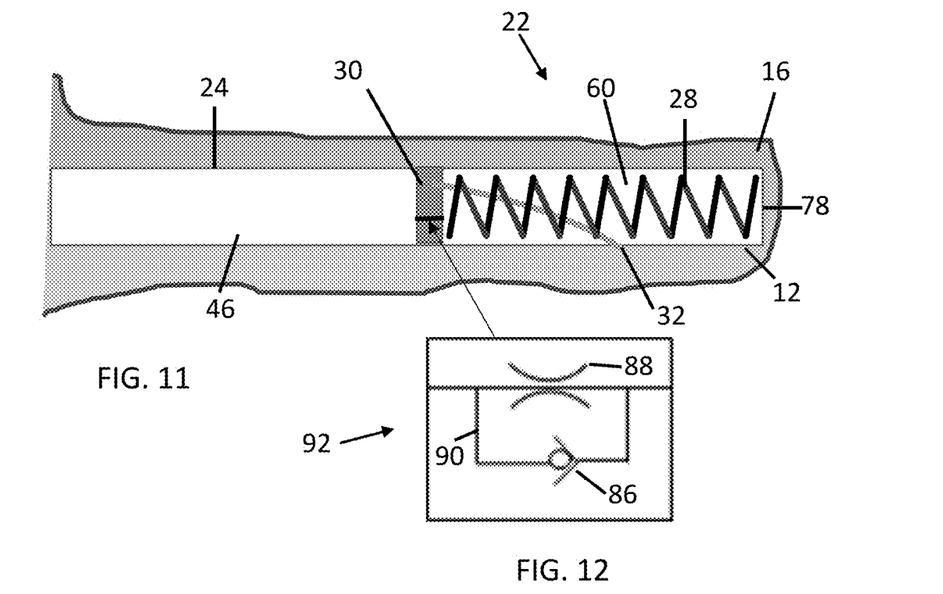
FIG. 11 illustrates a side view of a coil-tube tunneling tool, according to aspects of the present embodiments.
FIG. 12 illustrates a side view schematic of a valve configuration, according to aspects of the present embodiments.
Figure 13:
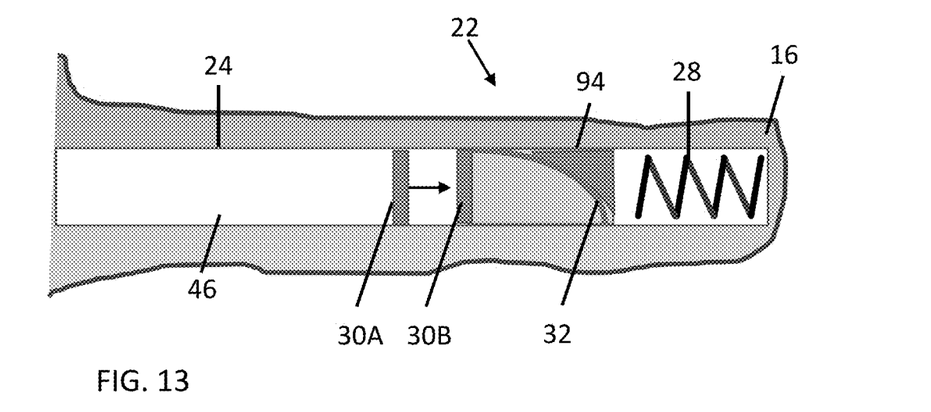
FIG. 13 illustrates a side view of a coil-tube tunneling tool, according to aspects of the present embodiments.

FIG. 11 illustrates a side view of an alternate embodiment of a coil-tube tunneling tool 22, according to aspects of the present embodiments. In the embodiment of FIG. 11, the CTT 22 includes the tube 24 including one or more springs 28 disposed in the downstream volume 60 (that is, on the downstream side of the piston 30) rather than in the upstream volume 46. The one or more springs 28 may be anchored to the backwall 78 of the tunnel 12 such that it is disposed between the tunnel backwall 78 on one end and the piston 30 on the other end. As fluid pressure builds up in the upstream volume 46 (for example, due to the flow of acidizing solution), the piston moves longitudinally (that is, to the right in the embodiments of FIGS. 11 and 13) such that the one or more hollow tubes 32 are pushed into the formation 16, thereby serving to stimulate the formation 16. In the embodiment of FIG. 11, the spring 28 is in an uncompressed state while in the embodiment of FIG. 13, the spring 28 is in a compressed state. The CTT 22 of FIG. 13 may also include one or more guides 94 which includes contouring or curvature to guide the one or more hollow tubes 32 into the formation 16 at a desired angle such that as the piston 30 moves from a first position 30A to a second downstream position 30B, the hollow tubes 32 contact the guide 94 and are redirected into the formation 16 as a result. As the fluid pressure in the upstream volume 46 recedes or decreases, the spring 28 expands and pushes the piston in a negative longitudinal direction (that is, to the left in the embodiments of FIGS. 11 and 13) such that it returns to the original position as shown in FIG. 11. The spring(s) 28, hollow tubes 32, and guide(s) 94 may be arranged such that the respective movements of each component does not interfere with the movements of other components. For example, the spring or springs 28 may be located at different circumferential angles around the tube 24 than the hollow tubes 32 and guide(s), while the guide(s) may be disposed longitudinally downstream of the piston 30.

FIG. 12 illustrates a side view schematic of an alternate valve configuration 92, according to aspects of the present embodiments. The alternate valve configuration 92 may be disposed within the piston 30 and may include a two-way flow restrictor 88 which allows a limited flow upstream or downstream through the flow restrictor 88. The alternate valve configuration 92 may also include a one-way valve 86 or ball valve 86 disposed in a bypass line 90. The one-way valve 86 or ball valve 86 may open if the pressure in the upstream volume 46 reaches a predetermined threshold (for example 5000-9000 psi), thereby allowing fluid flow (for example, a flow of acidizing solution) through the piston 30. The acidizing solution or fluid may be pumped or compressed via surface equipment or via downhole equipment such as electric submersible pumps (ESPs).

Figure 14:
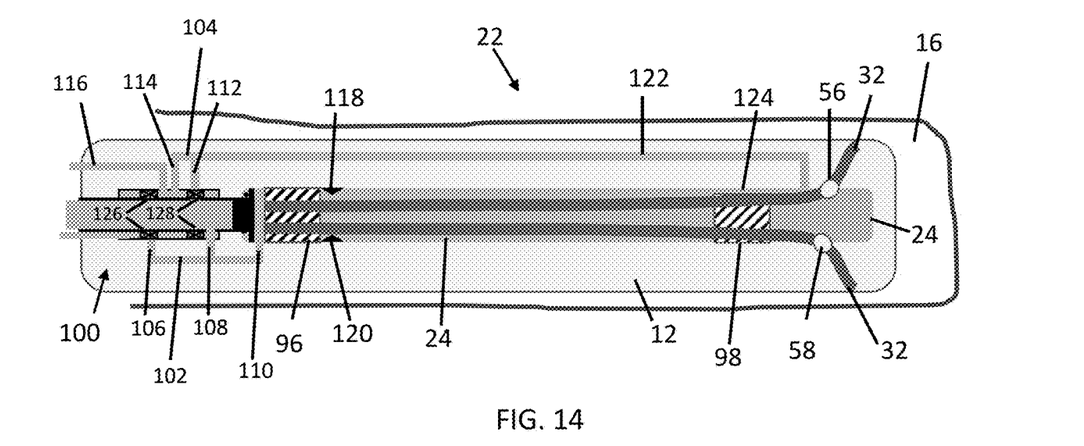
FIG. 14 illustrates a side view of a coil-tube tunneling tool, according to aspects of the present embodiments.

FIGS. 14-17 illustrate side views of an alternate embodiment of a coil-tube tunneling tool (CTT) 22, according to aspects of the present embodiments. The CTT 22 may include a tube 24 horizontally disposed within a tunnel 12 which in turn may be disposed within the formation 16 and may fluidly connect to the borehole 10 (shown in FIG. 1). In the embodiment of FIG. 14, the CTT 22 may include a valve plenum 100 fluidly connecting to one or more fluid delivery systems (for example a drill pipe or tubular) disposed within the the borehole 100. The valve plenum 100 may be fluidly connected between the borehole 10 and the tube 24 (shown in FIG. 1). The valve plenum 100 may include a plurality of valves 126, 128 and piping manifolds 102, 104 which may each include a plurality of connection pipes 106, 108, 110, 112, 114, 116. An inlet manifold 102 may be disposed at the bottom of the valve plenum 100 and may be fluidly coupled to the valve plenum via 100 a first inlet feed line 106 and a second inlet feed line 108 disposed downstream of the first inlet feed line 106, each of the first and second inlet feed lines 106, 108 extending downward from the valve plenum 100 to the inlet manifold 102. The inlet manifold 102 may be fluidly connected to the tube 24 via one or more inlet lines 110. An outlet manifold 104 may be disposed on the top portion of the valve plenum 100 and may be fluidly connected to the valve plenum 100 by first and second exit lines 112, 114, which may extend upwardly from the valve plenum 100. The first exit line 112 may be disposed downstream of (that is, to the right of) the second exit line 114 with respect to the direction of fluid flow 40 (shown in FIG. 15) into the valve plenum 100. (Note: with respect to return flow 130 (shown in FIG. 15) in the return line 122, the first exit line 112 is disposed slightly upstream of the second exit line 114). Each of the first and second exit lines 112, 114 fluidly couple the valve plenum 100 to a return line 122, which itself is fluidly connected to a downstream (or distal) end of the tube 24. A drain line 116 may be fluidly coupled to the valve plenum 100 and may allow for both the draining of fluids out of the tube 24 and tunnel 12, as well as reverse-flow operations of fluid through the CTT 22, as discussed below.

Referring still to FIG. 14, the CTT 22 may include a mobile piston 96 that is disposed within the tube 24. The mobile piston 96 may be coupled to one or more hollow tubes 32. The CTT 22 may also include a stationary piston 98, disposed within the tube 24 downstream of (that is, to the right in the embodiment of FIG. 14) the mobile piston 96. A top notch 118 and a bottom notch 120 may be disposed at the upstream end of the tube 24 preventing (under some operating conditions) the mobile piston 96 from translating downstream (that is, to the right). The top notch 118 and a bottom notch 120 may initially be disposed longitudinally between the mobile piston 96 and the stationary piston 98. As pressure builds up in the valve plenum 100 and the inlet line 110 (for example, due to a fluid flow 40 of acidizing solution), the force on the upstream end of the mobile piston 96 may exceed the forces from the top and bottom notches 118, 120 acting to hold the mobile piston 96 in place, thereby causing the mobile piston 96 to move past the top and bottom notches 118, 120 toward the stationary piston 98 (at which point, both the top and bottom notches 118, 120 are disposed longitudinally upstream of both the mobile piston 96 and the stationary piston 98). The hollow tubes 32, which are disposed through the first and second holes 56, 58 at the distal or downstream ends of the respective hollow tubes 32, may be pushed by the mobile piston 96 into the formation 16 as the mobile piston 96 moves to the right (that is, downstream). Acidizing solution may flow both through the hollow tubes 32 into the formation 16, as well as through a return line 122 fluidly coupled to the distal end of the tube 24, then through the valve plenum 100 (that is, via the first or second outlet lines 112, 114, or the first and the second outlet lines 112, 114), and eventually through the drain line 116. A radial gap 124 may be disposed between the radially outer surface of the stationary piston 98 and the interior wall of the tube 24 thereby allowing fluid (such as acidizing solution) to flow past the stationary piston 98 in either direction, as the mobile piston 96 moves back and forth. Fluid flow through the CTT 22 may be controlled via a plurality of upstream valves 126 and a plurality of downstream valves 128 disposed within the valve plenum 100, at least one of each of the plurality of downstream and upstream valves 128, 126 being disposed in each of the inlet and outlet manifolds 102, 104 (and fluidly coupled thereto, immediately upstream and/or downstream of the respective inlet and outlet manifolds 102, 104).

Figure 15:
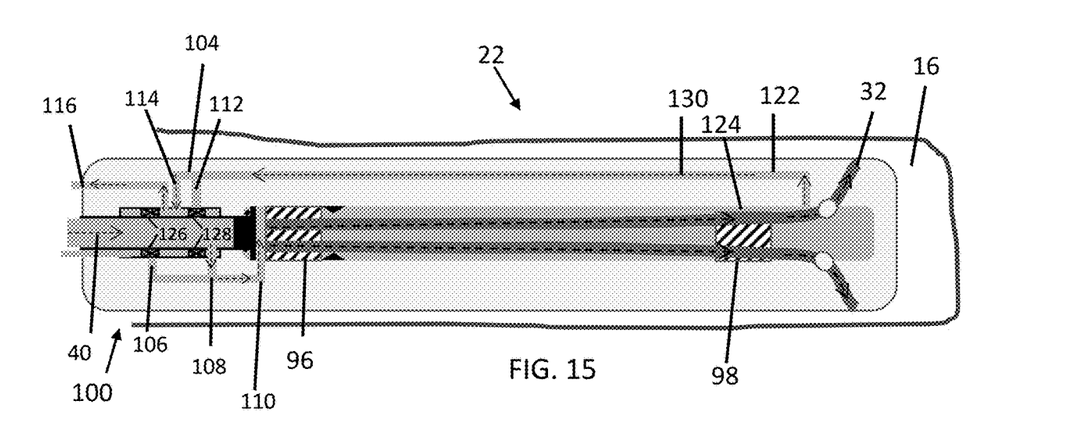
FIG. 15 illustrates a side view of a coil-tube tunneling tool, according to aspects of the present embodiments.

FIG. 15 illustrates a side view of an alternate embodiment of a coil-tube tunneling tool (CTT) 22, according to aspects of the present embodiments. In the embodiment of FIG. 15, each of the plurality of upstream and downstream valves 126, 128 are in the same positions as those of FIG. 14. In the embodiment of FIG. 15, a fluid flow 40 enters the valve plenum 100 and bypasses the first inlet feed line 106 due to the bottom upstream valve 126 being in a closed position. The flow continues past the bottom downstream valve 128 into the second inlet feed line 108 and the inlet line 110, where the fluid flow begins to exert force on the mobile piston 96. A valve (for example a ball valve 42 as well as other types of valves) may be disposed in the mobile piston 96 to allow the fluid flow to (selectively or passively) pass from an upstream side (that is, the left side) of the mobile piston 96 to a downstream side (that is, the right side) of the mobile piston 96. Flow that passes the stationary piston 98 via the radial gap 124 may become a return flow 130 flowing through the return line 122, past the first exit line 112 and top upstream valve 128 (which is in a closed position), through the second exit line 114, and eventually out through the drain line 116. Fluid also flows through each of the hollow tubes 32, and into the formation 16.

Figure 16:
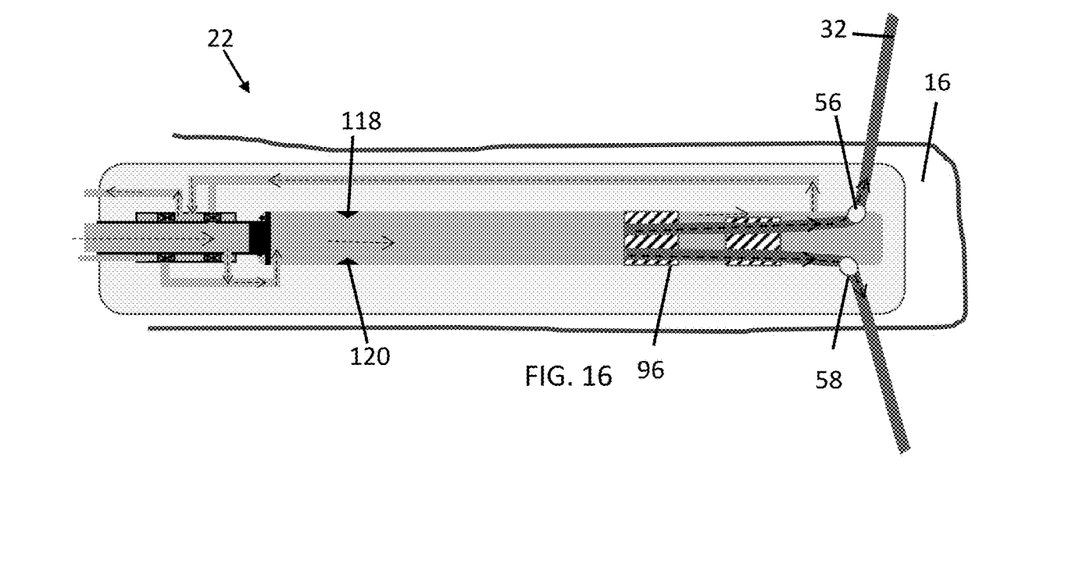
FIG. 16 illustrates a side view of a coil-tube tunneling tool, according to aspects of the present embodiments.

FIG. 16 illustrates a side view of an alternate embodiment of a coil-tube tunneling tool (CTT) 22, according to aspects of the present embodiments. In the embodiment of FIG. 16, the valve and flow configurations are the same as those of FIG. 15. In the embodiment of FIG. 16, the pressure has built up on the upstream side (that is, the left side) of the mobile piston 96 and has pushed the mobile piston 96 past the top and bottom notches 118, 120. As a result, the hollow tubes 32, which are disposed through the first and second hole 56, 58, are driven into the formation 16, thereby serving to stimulate the formation 16. A fluid flow 40 (for example, a flow of acidizing solution) may flow through the hollow tubes 32 into the formation 16, thereby further stimulating the formation 16.

Figure 17:
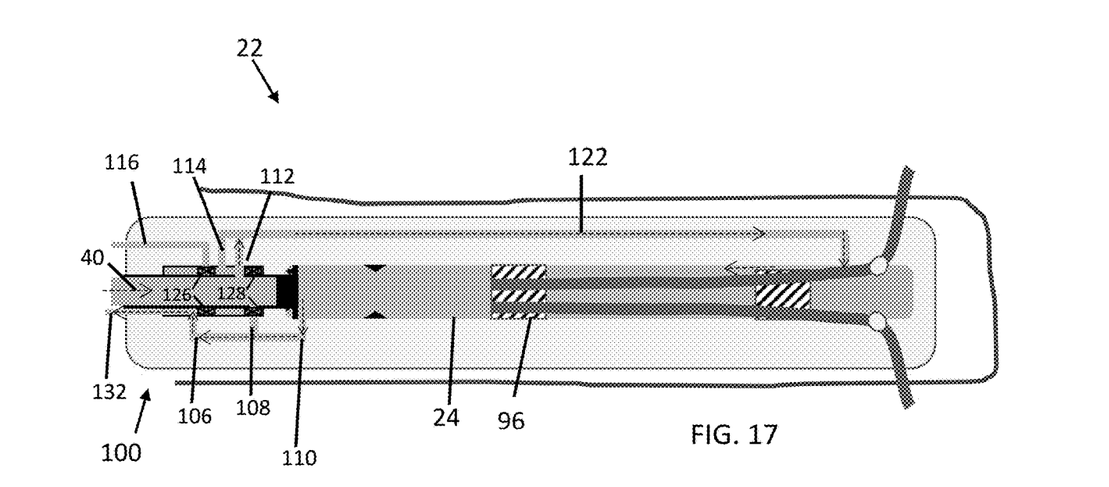
FIG. 17 illustrates a side view of a coil-tube tunneling tool, according to aspects of the present embodiments.

FIG. 17 illustrates a side view of an alternate embodiment of a coil-tube tunneling tool (CTT) 22, according to aspects of the present embodiments. In the embodiment of FIG. 17, the CTT 22 is in a reverse-flow configuration in which a fluid flow 40 (such as an acidizing solution) enters the valve plenum 100 and then passes the upstream valves 126 and flows into the first exit line 112, through the bypass line 122, back into the tube 24, back out through the inlet line 110 and the first inlet feed line 106, and eventually out through a reverse flow drain line 132. As the fluid flow contacts, passes, and/or flows through the mobile piston 96, the mobile piston 96 is pushed back to the original upstream position (for example, the position illustrated in FIG. 14). The two downstream valves 128 are positioned to allow reserve flow through the first exit line 112 and to prevent fluid flow through the second inlet feed line 108. The two upstream valves 126 are positioned to allow reverse flow through the first inlet feed line 106 and to prevent flow through the drain line 116. By including parallel flow arrangements between both the first and second inlet feed lines 106, 108 as well as the first and second exit lines 112, 114, and by controlling the flow between the valve plenum 100 and the flow lines 106, 108, 112, 114 via the upstream and downstream pluralities of valves 126, 128, the coil-tube tunneling tool 22 of the present embodiments enables fluid flow 40 entering the valve plenum 100 to be selectively routed in a forward-flow or reverse-flow configuration, without requiring any change to the inlet fluid flow 40 itself. In other embodiments, the inlet manifold may be located at the top of the valve plenum 100 and the outlet manifold 104 may be located at the bottom. In other embodiments, one or more of the inlet and outlet manifolds 102, 104 may be located on the side of the valve plenum 100 (that is, circumferentially rotated about ninety (90) degrees from their respective positions in FIGS. 14-17). In other embodiments, the CTT 22 may include other valving and piping configurations. Whereas the embodiments of FIGS. 2-13 may include one or more valves 42 that are passively controlled, the embodiments of FIGS. 14-17 may include one or more valves 126, 128 that are selectively or actively controlled.

Referring still to FIGS. 14-17, in operation, each of the upstream and downstream valves 126, 128 (disposed along both the top and the bottom of the valve plenum 100) may be controlled and selectively opened and closed via any suitable devices including (but not limited to) magnetic actuators, hydraulics, servo motors, electric motors, solenoids, fluid actuators, and other means. One or more wirelines may be used to provide both electrical and communication couplings between the coil-tube tunneling tool (CTT) 22 and one or more control systems (which may include, for example, programmable logic controllers (PLCs), integrated circuits, computers, central processing units (CPUs), and/or other computing devices) located at a downhole location within the borehole 10 and/or at the surface. The CTT 22 may be constructed as a single unit or module that may be deployed at various locations such as within tunnels 12, boreholes 10 (or wellbores), production wells, recovery wells, exploration wells, and/or discovery wells, as well as at various penetration depths within each of these locations. For example, the tube 24, valve plenum 100, pistons 30, 96, 98, springs 28, hollow tubes 32, and connection pipes or flow lines 106, 108, 110, 112, 114, 116, 122, 132 may collectively be integrated as a single unit, module, or bottom hole assembly (BHA) that may be selectively deployed as desired by the user or users. Fluid flowing through the hollow tubes 32 after they have penetrated into the formation 16 may help to ensure that the distal ends of the hollow tubes 32 do not get stuck in the formation 16, as the fluid is at a high enough pressure to continually purge debris and other materials from the holes 56, 58, tube(s) 24, tunnel 12, and/or borehole 10, thereby allowing the hollow tubes 32 to be retrieved back into the tube 24 after penetrating into the formation 16. The force of the spring(s) 28, as well as the solubility of the formation 16 in the presence of acidizing solution will also aid in the retrieval of the hollow tubes 32. The matrix stimulation tool 22 may then be redeployed to a new location and the upstream side of the piston 30 may be re-pressurized allowing the stimulation process to begin again.

Each of the components described herein may be composed of stainless steel, carbon steel, austenitic steel, metallic alloys, elastomers, and other suitable materials commonly used in the oil and gas industries.

By using a stimulation tunneling tool (for example, a coil-tube tunneling tube 22) equipped with a piston 30 and a spring 28 (or alternatively, with a pneumatic tube 24, a mobile piston 96, and a stationary piston 98) to push and pull the hollow tubes 32 in and out of the formation 16, multiple tunnels may be created from a central wellbore 10. The coil-tube tunneling tool (CTT) 22 of the present disclosed embodiments enables the creation of multiple tunnels at the same time, while also providing for the robust extension and retrieval of hollow tubes 32 disposed within the tube 24.

Elements of different implementations described may be combined to form other implementations not specifically set forth previously. Elements may be left out of the processes described without adversely affecting their operation or the operation of the system in general. Furthermore, various separate elements may be combined into one or more individual elements to perform the functions described in this specification.

Other implementations not specifically described in this specification are also within the scope of the following claims.

These and other features, aspects and advantages of the present invention will become better understood with reference to the following description and appended claims. The accompanying drawings, which are incorporated in and constitute a part of this specification, illustrate embodiments of the present disclosure and, together with the description, serve to explain the principles of the present embodiments.

Certain Definitions

In order for the present disclosure to be more readily understood, certain terms are first defined below. Additional definitions for the following terms and other terms are set forth throughout the specification.

An apparatus, system, or method described herein as "comprising" one or more named elements or steps is open-ended, meaning that the named elements or steps are essential, but other elements or steps may be added within the scope of the apparatus, system, or method. To avoid prolixity, it is also understood that any apparatus, system, or method described as "comprising" (or which "comprises") one or more named elements or steps also describes the corresponding, more limited apparatus system, or method "consisting essentially of" (or which "consists essentially of") the same named elements or steps, meaning that the apparatus, system, or method includes the named essential elements or steps and may also include additional elements or steps that do not materially affect the basic and novel characteristic(s) of the system, apparatus, or method. It is also understood that any apparatus, system, or method described herein as "comprising" or "consisting essentially of" one or more named elements or steps also describes the corresponding, more limited, and closed-ended apparatus, system, or method "consisting of" (or "consists of") the named elements or steps to the exclusion of any other unnamed element or step. In any apparatus, system, or method disclosed herein, known or disclosed equivalents of any named essential element or step may be substituted for that element or step.

As used herein, the term "longitudinally" generally refers to directions that are co-linear with or parallel to the centerlines 40 of the coil-tube tunneling tool 22, tunnel 12, tube 24, and/or matrix stimulation tool 22. Angles that are defined relative to a longitudinal direction may include both negative and positive angles. For example, a 30-degree angle relative to the longitudinal direction may include both an angle that is rotated clockwise 30 degrees from the vertical direction (that is, a positive 30-degree angle) as well as an angle that is rotated counterclockwise 30 degrees from the vertical direction (that is, a negative 30-degree angle).

As used herein, the term "stimulation," "matrix stimulation," or "formation stimulation" may be used to describe a process of injecting a fluid into the formation, either an acid or solvent at pressures below the fracturing pressure, to improve the production or injection flow capacity of a well.

As used herein, "a" or "an" with reference to a claim feature means "one or more," or "at least one."

As used herein, the term "substantially" refers to the qualitative condition of exhibiting total or near-total extent or degree of a characteristic or property of interest.

EQUIVALENTS

It is to be understood that while the disclosure has been described in conjunction with the detailed description thereof, the foregoing description is intended to illustrate and not limit the scope of the invention(s). Other aspects, advantages, and modifications are within the scope of the claims.

This written description uses examples to disclose the invention, including the best mode, and also to enable any person skilled in the art to practice the present embodiments, including making and using any devices or systems and performing any incorporated methods. The patentable scope of the present embodiments is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A matrix stimulation tool system comprising:
   a tube disposed within a horizontal tunnel within a formation, the horizontal tunnel fluidly connected to a borehole disposed within the formation;
   at least one piston disposed within the tube, the piston longitudinally moveable within the tube, the piston comprising a generally cylindrical shape;
   at least one hollow tube coupled to the at least one piston, the at least one hollow tube comprising a distal end disposed within at least one hole disposed within a wall of the tube at an interface with the formation; and
   at least one valve disposed within the at least one piston, the at least one valve allowing a flow of fluid through the at least one piston in at least one direction,
   where fluid pressure on an upstream side of the at least one piston longitudinally pushes the at least one piston, thereby causing the at least one hollow tube to penetrate into the formation.

2. The system of claim 1, where the fluid pressure is caused by pumped acidizing solution, and
   where the fluid comprises abrasive solids with an average diameter size ranging from about 0.01 mm to about 0.5 mm.

3. The system of claim 2, where the at least one hollow tube is from about five (5) to about thirty (30) feet in length,
   where the at least one hollow tube comprises an inner diameter from about 0.1 inch to about 0.5 inch, and
   where the abrasive solids comprise sand, metal particles, or both sand and metal particles, in spherical or platelet shapes.

4. The system of claim 1, where the at least one hollow tube comprises:
   a first hollow tube disposed at a top portion of the at least one piston and coupled to a top ball valve; and
   a second hollow tube disposed at a bottom portion of the at least one piston and coupled to a bottom ball valve,
   where the at least one hollow tube is disposed through the at least one hole at an angle from about fifteen (15) degrees to about seventy (70) degrees.

5. The system of claim 4, where the fluid pressure on an upstream side of the at least one piston causes the at least one piston to be longitudinally displaced from about one (1) foot to about thirty (30) feet,
   where the first hollow tube extends from the top portion of the at least one piston to the bottom of the horizontal tunnel, and
   where the second hollow tube extends from the bottom portion of the at least one piston to the top of the horizontal tunnel.

6. The system of claim 1, further comprising a one-way check valve disposed longitudinally upstream of the at least one piston.

7. The system of claim 1, further comprising at least one spring coupled to the at least one piston.

8. The system of claim 7, where the at least one spring is disposed longitudinally upstream of the at least one piston.

9. The system of claim 7, where the at least one spring is disposed longitudinally downstream of the at least one piston.

10. The system of claim 9, further comprising at least one guide disposed downstream of the at least one piston and adjacent to the at least one hollow tube, the at least one guide at least partially dictating an angle at which the at least one hollow tube penetrates the formation.

11. The system of claim 1, further comprising at least one ball valve disposed within the at least one piston, where the at least one ball valve opens to allow fluid to flow from an upstream side of the at least one piston to a downstream side of the at least one piston when the pressure on the upstream side of the at least one piston reaches a predetermined value.

12. The system of claim 11, the at least one ball valve comprising at least one ball,
where, in a closed position, the at least one ball is disposed upstream of a throat area disposed in the at least one piston,
where, in an open position, the at least one ball is disposed downstream of the throat area, and
where a spring couples the at least one ball to at least one internal wall of the at least one piston.

13. The system of claim 11, where the predetermined pressure is from about five-thousand (5000) psi to about nine-thousand (9000) psi.

14. The system of claim 1, further comprising a valve plenum fluidly connecting the borehole to the tube.

15. The system of claim 14, where the at least one piston comprises:
a mobile piston; and
a stationary piston disposed longitudinally downstream of the mobile piston,
where the at least one hollow tube is coupled to the mobile piston and disposed through the stationary piston.

16. The system of claim 15, further comprising:
at least one inlet pipe fluidly connecting the valve plenum to the tube;
at least one return pipe fluidly connecting the tube back to the valve plenum;
at least one upstream valve disposed within the valve plenum; and
at least one downstream valve disposed within the valve plenum,
where the at least one upstream valve and the at least one downstream valve are selectively adjusted to open and closed positions corresponding to forward flow and reverse flow operations of the matrix stimulation tool.

17. The system of claim 16, further comprising:
a top notch disposed within the tube; and
a bottom notch disposed within the tube,
where the top notch and the bottom notch are disposed between the mobile piston and the stationary piston.

18. The system of claim 16, further comprising:
a top notch disposed within the tube; and
a bottom notch disposed within the tube,
where the top notch and the bottom notch are disposed longitudinally upstream of both the mobile piston and the stationary piston.

19. The system of claim 1, where the fluid comprises gelled hydrochloric acid (HCl) at a concentration from about five (5) percent to about thirty-two (32) percent.

20. A matrix stimulation tool system comprising:
a cylindrical tube disposed within a horizontal tunnel within a formation, the horizontal tunnel fluidly connected to a borehole disposed within the formation;
at least one piston disposed within the cylindrical tube, the piston longitudinally moveable within the cylindrical tube;
at least one hollow tube coupled to the at least one piston, the at least one hollow tube comprising a distal end disposed within a hole disposed within a wall of the cylindrical tube; and
a valve plenum fluidly connecting the borehole to the cylindrical tube,
where movement of the at least one piston within the cylindrical tube causes movement of the distal end of the at least one hollow tube through the hole.

21. A method of stimulating a formation comprising:
disposing a stimulation tool within a horizontal tunnel disposed in the formation, the horizontal tunnel fluidly connected to a borehole disposed within the formation, the stimulation tool comprising:
a cylindrical tube;
at least one piston disposed within the cylindrical tube; and
at least one hollow tube coupled to a downstream side of the at least one piston;
providing pressurized fluid to an upstream side of the at least one piston via the borehole such that the pressurized fluid pushes the at least one piston longitudinally downstream thereby causing the at least one hollow tube to penetrate the formation; and
actively or passively opening a valve coupled to the matrix stimulation tool such that the pressure differential between the upstream and downstream sides of the at least one piston is reduced.

22. The method of claim 21, the stimulation tool further comprising:
a spring anchored at the upstream side of the at least one piston and coupled thereto, the spring stretching as the at least one piston moves longitudinally downstream;
the method further comprising:
after the valve is open, flowing fluid through the valve and the at least one hollow tube to the downstream side of at least one piston;
retracting the at least one piston longitudinally upstream as a result of tension in the spring;
disposing the stimulation tool at a second depth within the horizontal tunnel; and
re-pressurizing the upstream side of the at least one piston.

23. The method of claim 22, where the pressurized fluid comprises an acidizing solution comprising at least one of hydrochloric acid (HCl), hydrofluoric acid (HF), CaMg(CO$_3$)$_2$, CaCO$_3$, FeS, formic acid, and acetic acid at concentrations by weight from about one (1) percent to about forty (40) percent.

24. The method of claim 23, where the acidizing solution comprises at least one of hydrofluoric acid (HF) and acetic acid.

25. The method of claim 23, where the acidizing solution comprises at least one of CaMg(CO$_3$)$_2$, CaCO$_3$, FeS, and formic acid.

* * * * *

UNITED STATES PATENT AND TRADEMARK OFFICE
CERTIFICATE OF CORRECTION

PATENT NO. : 11,131,175 B2  
APPLICATION NO. : 16/791460  
DATED : September 28, 2021  
INVENTOR(S) : Qasim Sahu et al.

It is certified that error appears in the above-identified patent and that said Letters Patent is hereby corrected as shown below:

On the Title Page

Column 2, Under the Foreign Patent Documents section, second reference, please replace "RU 1692195 A2" with "SU 1692195 A2".

Signed and Sealed this  
Thirtieth Day of November, 2021

Drew Hirshfeld  
*Performing the Functions and Duties of the*  
*Under Secretary of Commerce for Intellectual Property and*  
*Director of the United States Patent and Trademark Office*